United States Patent
Seo

(10) Patent No.: US 7,103,387 B2
(45) Date of Patent: Sep. 5, 2006

(54) METHOD FOR DISPLAYING DATA FOR MULTITASKING OPERATION IN MOBILE TELECOMMUNICATION TERMINAL

(75) Inventor: Kwang-Seok Seo, Kyoungki-do (KR)

(73) Assignee: Curitel Communications, Inc., (KR)

( * ) Notice: Subject to any disclaimer, the term of this patent is extended or adjusted under 35 U.S.C. 154(b) by 427 days.

(21) Appl. No.: 10/185,141

(22) Filed: Jun. 27, 2002

(65) Prior Publication Data

US 2003/0083106 A1    May 1, 2003

(30) Foreign Application Priority Data

Oct. 31, 2001  (KR) ...................... 10-2001-0067663

(51) Int. Cl.
*H04B 1/38* (2006.01)
*H04M 1/00* (2006.01)

(52) U.S. Cl. .................. 455/566; 455/466; 455/550.1; 455/556.2; 455/414.4

(58) Field of Classification Search ................ 455/556, 455/550.1, 556.2, 154.2, 414.3, 414.4, 466; 715/809, 806, 526; 345/902, 473, 475; 719/310; 718/107

See application file for complete search history.

(56) References Cited

U.S. PATENT DOCUMENTS

| | | | |
|---|---|---|---|
| 5,678,196 A | 10/1997 | Doyle | |
| 6,087,952 A * | 7/2000 | Prabhakaran | 340/693.5 |
| 6,151,507 A * | 11/2000 | Laiho et al. | 455/466 |
| 6,233,467 B1 | 5/2001 | Rydbeck | |
| 6,339,780 B1 * | 1/2002 | Shell et al. | 715/526 |
| 6,381,448 B1 * | 4/2002 | Narusawa | 455/133 |
| 6,389,447 B1 * | 5/2002 | Singh | 718/100 |
| 6,405,060 B1 | 6/2002 | Schroeder et al. | |
| 6,408,192 B1 * | 6/2002 | Suzuki | 455/566 |
| 6,519,481 B1 * | 2/2003 | Kobayashi | 455/566 |
| 2001/0053692 A1 * | 12/2001 | Ito et al. | 455/425 |
| 2002/0002682 A1 | 1/2002 | Tsuchiyama et al. | |
| 2002/0017630 A1 | 2/2002 | Uchida et al. | |
| 2002/0025825 A1 * | 2/2002 | Hirayama et al. | 455/566 |

(Continued)

FOREIGN PATENT DOCUMENTS

GB     2 357 164 A     6/2001

(Continued)

*Primary Examiner*—Charles N Appiah
*Assistant Examiner*—Huy Phan
(74) *Attorney, Agent, or Firm*—Blakely Sokoloff Taylor & Zafman

(57) ABSTRACT

The present invention relates to a method for displaying data for multitasking operation in a mobile telecommunication terminal without deleting a task with a lower priority when a task with a higher priority simultaneously is operated. In other words, the inventive mobile telecommunication terminal is capable of converting a display assigned for each task while on multitasking operation. In order to implement the above function, a method for displaying data for multitasking operation in a mobile telecommunication terminal, comprising the steps of: while operating a first task, operating a second task responsive to a multitask request; determining whether a capacity of display conversion exceeds; if the capacity of display conversion exceeds, outputting an error message; and if the capacity of display conversion does not exceed, storing a display for displaying the first task and displaying the second task.

3 Claims, 4 Drawing Sheets

U.S. PATENT DOCUMENTS

| | | |
|---|---|---|
| 2002/0036642 A1 | 3/2002 | Kwon et al. |
| 2002/0039915 A1* | 4/2002 | Hama et al. ............... 455/566 |
| 2002/0061771 A1 | 5/2002 | Hwang et al. |
| 2002/0065068 A1 | 5/2002 | Nobukiyo |
| 2002/0065110 A1* | 5/2002 | Enns et al. ............... 455/566 |
| 2002/0081997 A1 | 6/2002 | Morishima |
| 2002/0086703 A1* | 7/2002 | Dimenstein et al. ....... 455/557 |
| 2002/0094826 A1 | 7/2002 | Lee |
| 2005/0105700 A1* | 5/2005 | Kim ...................... 379/88.22 |

FOREIGN PATENT DOCUMENTS

| | | |
|---|---|---|
| JP | 11-225189 | 8/1999 |
| WO | WO 98/48550 | 10/1998 |

* cited by examiner

TASK 1

TASK 2

TASK 3

TASK 4

METHOD FOR DISPLAYING DATA FOR MULTITASKING OPERATION IN MOBILE TELECOMMUNICATION TERMINAL

FIELD OF THE INVENTION

The present invention relates to a user interface of a mobile telecommunication terminal; and, more particularly, to a method for displaying data for multitasking operation in a mobile telecommunication terminal.

DESCRIPTION OF RELATED ARTS

In a conventional mobile telecommunication terminal, a method for controlling a display is performed by sharing a 'Foreground' process and a 'Background' process in one display unit.

In this case, 'Foreground' process means a process for controlling a program with a higher priority to be operated among several simultaneously operated programs such as a multi-program, a multi-processor and so on. Also, 'Background' process means a process for controlling a program with a lower priority to be operated only when a program with a higher priority is not operated among several simultaneously operated programs.

However, the above conventional display control causes a problem of deleting a text message on operation when receiving a calling signal (e.g., call terminated) that has a higher priority than a text message is inputted.

Therefore, it is not proper to employ the conventional display control for processing a multitasking program, e.g., downloading a file while playing a moving picture expert group layer 3 (MP3) and editing the Short Message Service (SMS) or Multimedia Message Service (MMS) simultaneously, required for a next generation mobile telecommunication terminal.

SUMMARY OF THE INVENTION

It is, therefore, an object of the present invention to provide a method for displaying data for multitasking operation in a mobile telecommunication terminal so that each assigned task can be operated by switching a display even in case that several programs are simultaneously operated.

In accordance with an aspect of the present invention, there is provided a method for displaying data for multitasking operation in a mobile telecommunication terminal, comprising the steps of: while operating a first task, operating a second task responsive to a multitask request; determining whether a capacity of display conversion exceeds; if the capacity of display conversion exceeds, outputting an error message; and if the capacity of display conversion does not exceed, storing a display for displaying the first task and displaying the second task.

In accordance with another aspect of the present invention, there is also provided a method of display conversion for multitasking operation in a mobile telecommunication terminal, comprising the steps of: allowing a user to select a display conversion menu for converting a display while performing multitasks; determining a display conversion mode according to the selection from the display conversion menu; in case of a rapid display conversion mode, selecting a task to be shifted so as to convert a display; and in case of a general display conversion mode, converting a display sequentially from a display for a current task through the use of a shift key.

BRIEF DESCRIPTION OF THE DRAWING(S)

The above and other objects and features of the present invention will become apparent from the following description of the preferred embodiments given in conjunction with the accompanying drawings, in which.

Figure 3:
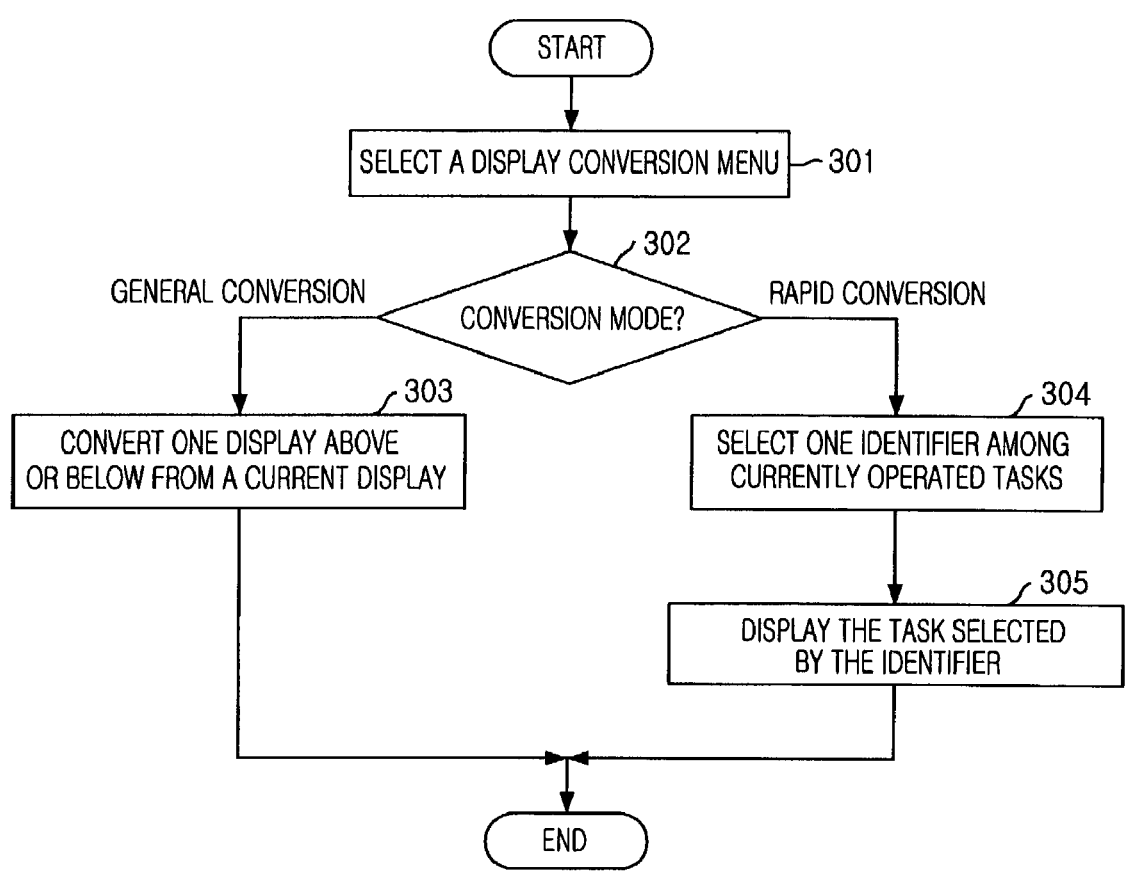
Figure 4:
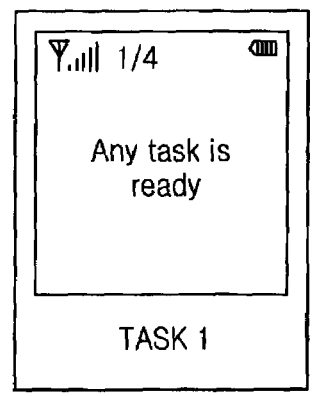
Figure 4:
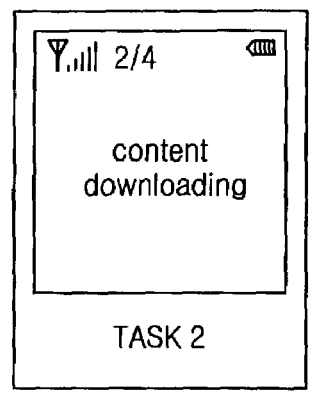
Figure 4:
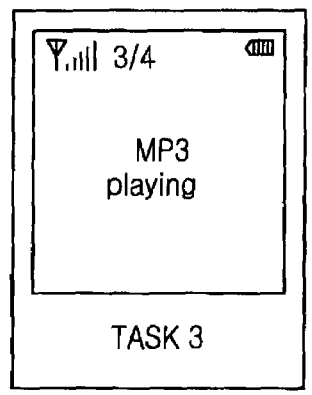
Figure 4:
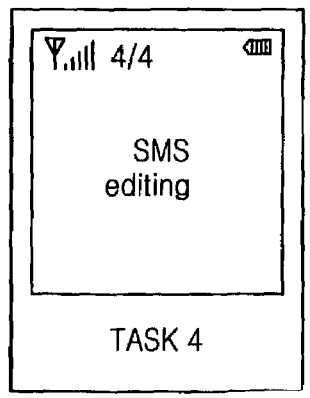

FIG. 3 is a flowchart illustrating a method for display conversion on multitasking operation in a mobile telecommunication terminal in accordance with the preferred embodiment of the present invention; and FIG. 4 shows illustrations of displays based on the method for display conversion on multitasking operation in a mobile telecommunication terminal in accordance with the preferred embodiment of the present invention.

DETAILED DESCRIPTION OF THE INVENTION

Other objects and aspects of the invention will become apparent from the following description of the embodiments with reference to the accompanying drawings, which is set forth hereinafter.

In this specification, a window for displaying a graphical user interface of a specific task is referred to as "a display".

Figure 1:
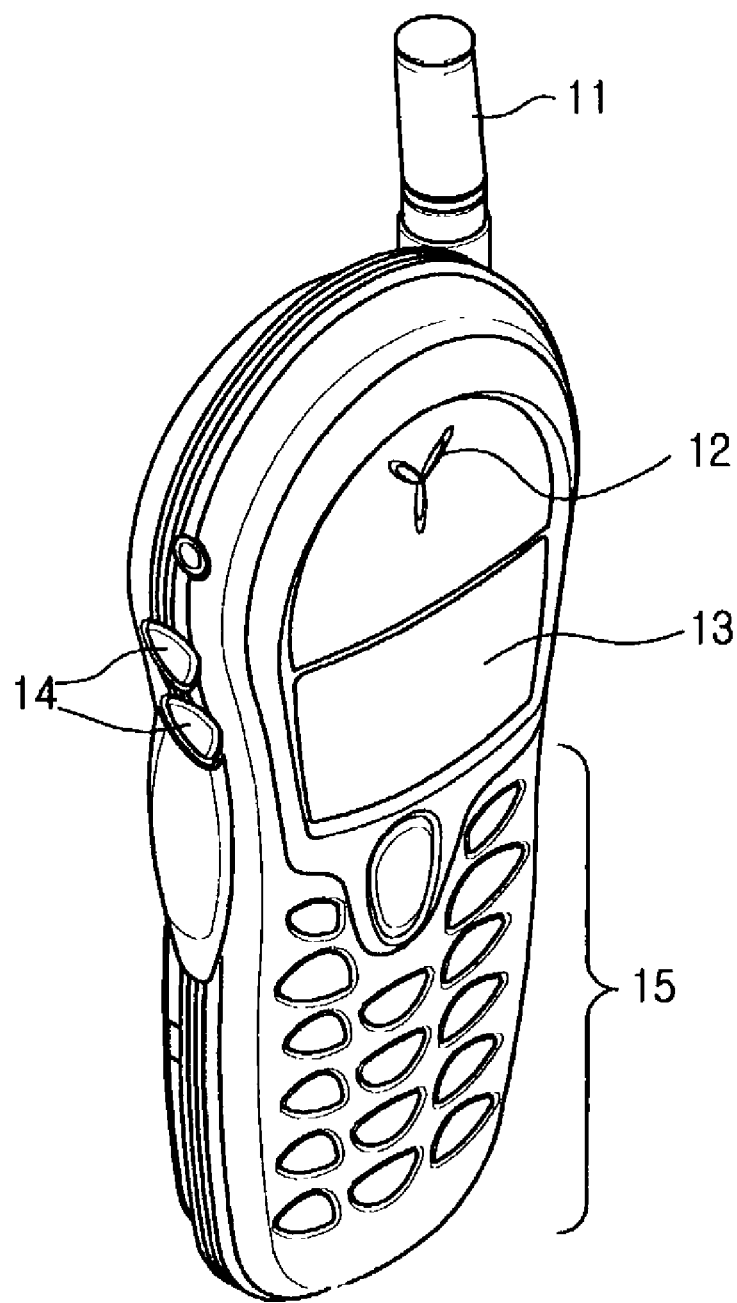
FIG. 1 is a diagram showing a mobile telecommunication terminal to which a preferred embodiment of the present invention is applied.

FIG. 1 is a diagram showing a mobile telecommunication terminal to which a preferred embodiment of the present invention is applied.

The mobile telecommunication terminal includes: an antenna unit 11 for receiving a wireless signal from an external source and sending a wireless signal to an external source; a speaker 12 for outputting a voice signal; a display unit 13 for displaying current states of the mobile telecommunication terminal; a high-low selection pad 14; and a keypad unit 15 for inputting texts or telephone numbers and so forth. Especially, a display conversion key is separately included inside the keypad.

Procedures for controlling the display unit 13 by the display conversion key will be explained.

Figure 2:
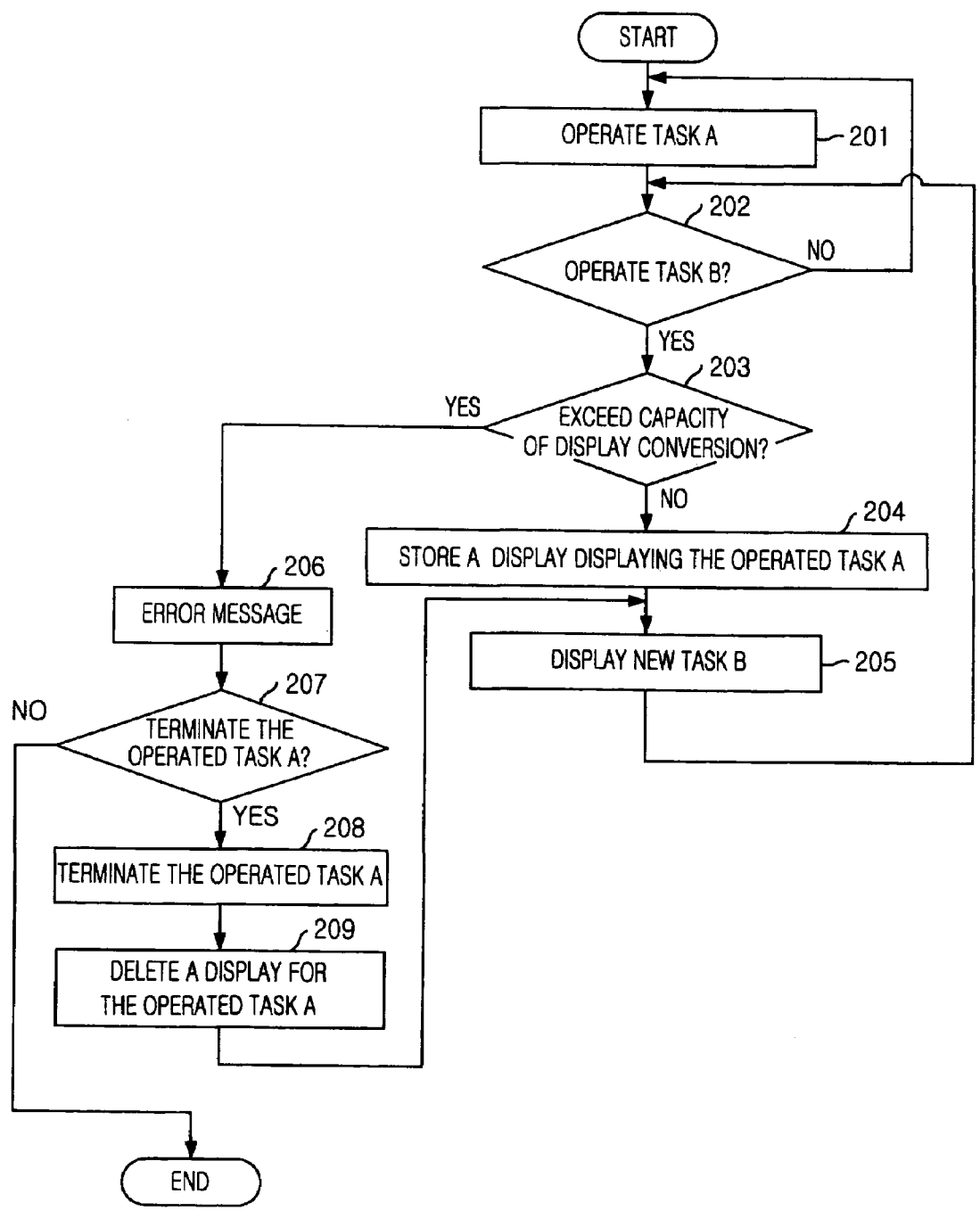
FIG. 2 is a flowchart depicting a method for displaying data on multitasking operation in a mobile telecommunication terminal in accordance with the preferred embodiment of the present invention.

FIG. 2 is a flowchart depicting a preferred embodiment of the present invention with respect to a method for displaying data when on multitasking operation in a mobile telecommunication terminal.

After task A is firstly performed at step 201, it is checked, at step 202, whether another new task B is being operated. At this time, if the task B is not operated, then the task A is continued to be operated. On the other hand, at step 203, in case that the task B is operated, it is determined whether a display of the task B exceeds a capacity of display conversion in the mobile telecommunication terminal. It is well known to ordinary ones skilled in the art that the capacity of the display conversion depends on a capacity of a memory.

After checking a result of step 203, if there is no exceeding in the capacity of display conversion of the mobile telecommunication terminal, at step 204, a display, that displays the task A being operated, is stored. Then, at step 205, the new task B is displayed on the display unit.

After checking a result of step 203, if there is an exceeding in the capacity of display conversion in the mobile telecommunication terminal, at step 206, an error message is outputted. Subsequently, at step 207, it is determined whether to terminate the task A currently being operated. In case that the task A is determined to be continuously operated, it is not allowed to covert the display of the task A to that of the task B. As a result, the task B operation is terminated instead.

As a checking result of step 207, in case that the operation of the task A is determined to be terminated, at step 209, the display for displaying the task A is deleted and the new task B appears on the display unit instead. At this time, storing the display that displays the operated task A is numbered differently from currently stored tasks operated previously. For instance, if the total numbers of currently stored tasks are '5', then the currently operated task A is stored with a number '6'.

FIG. 3 is a flowchart illustrating a method for display conversion on multitasking operation in a mobile telecommunication terminal in accordance with the preferred embodiment of the present invention.

Referring to FIG. 3, in order to convert a display in a mobile telecommunication terminal on multitasking, at step 301, a display conversion menu is firstly selected. Once the display conversion menu is selected, at step 302, a display conversion mode is determined.

In this case, there are two types of the display conversion mode; that are, a general conversion mode and a rapid conversion mode. Each mode is performed in accordance with a user's selection.

At step 303, in case of selecting a general conversion mode, the display conversion is performed sequentially in one display above or below by selecting a shift key on the current display or choosing a display conversion selection key.

Meanwhile, at step 304, in case of selecting a rapid conversion mode, identifiers, i.e., numbers, of currently operating tasks are outputted and one identifier is selected, or one particular identifier among identifiers for currently operating tasks is specifically inputted and selected.

As a result of step 304, the task, selected by the chosen identifier, is displayed at step 305.

FIG. 4 shows illustrations of display based on the inventive method for display conversion on multitasking operation in a mobile telecommunication terminal.

As referred in FIG. 4, a display for multitasking in a mobile telecommunication terminal represents a location of a current task among total tasks.

At this time, shifts to each assigned task follow the same procedures as shown in FIG. 3.

FIG. 4 also illustrates an arbitrary task operation on each display unit, and an identifier for representing a Nth display is shown on a upper side of the display unit. As shown in FIG. 4, the serial number of a corresponding task remains unchanged when a user selects the corresponding task. For example, the serial number of the second task remains unchanged when the second task is displayed.

As can be seen from the above descriptions, the present invention provides advantages that it is possible to control each task separately while on multitasking operation by maintaining each display corresponding to each task in a mobile telecommunication terminal. Also, it is possible to prevent a deletion of a current task on a display when another new task with a higher priority begins to be performed.

In addition, the method as described above can be implemented by storing instructions on a computer readable recording medium such as a CD-ROM, a RAM, a ROM, a floppy disk, a hard disk, or a magneto-optical disk.

While the present invention has been described with respect to certain preferred embodiments, it will be apparent to those skilled in the art that various changes and modifications may be made without departing from the scope of the invention as defined in the following claims.

What is claimed is:

1. A method for displaying data for multitasking operation in a mobile telecommunication terminal, comprising the steps of:
   (a) while operating a first task, operating a second task responsive to a multitask request;
   (b) determining whether a capacity of display conversion exceeds;
   (c) if the capacity of display conversion exceeds, outputting an error message;
   (d) if the capacity of display conversion does not exceed, storing a display for displaying the first task with a serial number according to an operating sequence order of the task and displaying the second task;
   (e) after performing the step (c), determining whether to terminate the first task;
   (f) in case of terminating the first task, deleting the display for the first task so as to display the second task; and
   (g) in case of continuing the first task, terminating the second task,
   wherein the serial number of the second task remains unchanged when the second task is displayed, and
   the display for an operating task includes the serial number of the corresponding task associated with a total number of operating tasks.

2. The method as recited in claim 1, wherein the mobile telecommunication terminal includes a display conversion switch for selecting one of multitasks.

3. A method of display conversion for multitasking operation in a mobile telecommunication terminal, comprising the steps of:
   (a) allowing a user to select a display conversion menu for converting a display while performing multitasks;
   (b) determining a display conversion mode according to the selection from the display conversion menu;
   (c) in case of a rapid display conversion mode, displaying all identifiers assigned for each operating task and allowing a user to select a task to be shifted so as to convert a display; and
   (d) in case of a general display conversion mode, converting a display sequentially according to an operating sequence order from a display for a current task through the use of a shift key,
   wherein the identifier includes a serial number indicating the operating sequence order of a corresponding task among a total number of operating tasks,
   the serial number of the corresponding task remains unchanged when the user selects the corresponding task,
   and the converted display includes the serial number of the corresponding task associated with the total number of operating tasks.

* * * * *